INVENTOR
W. C. MORSE
BY [signature]
ATTORNEY

Oct. 29, 1968 W. C. MORSE 3,408,515

SECOND OVERTONE DT-CUT QUARTZ RESONATOR

Filed March 25, 1966 3 Sheets-Sheet 3

United States Patent Office 3,408,515
Patented Oct. 29, 1968

3,408,515
SECOND OVERTONE DT-CUT QUARTZ RESONATOR

William C. Morse, Center Valley, Pa., assignor to Bell Telephone Laboratories, New York, N.Y., a corporation of New York Filed Mar. 25, 1966, Ser. No. 537,500
2 Claims. (Cl. 310—9.5)

ABSTRACT OF THE DISCLOSURE

The specification describes DT-cut quartz crystals designed for the frequency range of 800 kc. to 4 mc. The crystals are driven at the second harmonic and have good mode selection if the length (Z')-to-width (X) ratios are in the ranges 0.20 to 0.23, 0.30 to 0.33 and 0.48 to 0.69.

This invention relates to rectangular piezoelectric quartz crystal plate elements and devices, such as wave filters and oscillators, incorporating such elements. More specifically, it concerns improved species of rectangular DT-cut quartz crystals adapted for operation at the second overtone frequency. Such crystals operate more effectively at higher frequencies than the normal DT or rectangular DT crystals of the prior art.

For application to the field of frequency selection, the most difficult frequency range for the quartz crystal designer is between approximately 800 kc. and 4 mc. The normal rectangular DT, face shear resonator becomes so small above 800 kc. that its Q drops sharply and becomes erratic. On the other hand, below 4 mc. a thickness shear (AT cut) resonator requires a plate having an impractically large diameter. Thus there is a pressing need for a new type of resonator for this troublesome frequency region.

This invention is directed to a rectangular DT quartz plate having split electrodes so that the plate is driven at its second overtone thus giving a resonance frequency of approximately twice the fundamental. It is particularly effective for the aforesaid troublesome frequency range. It has been found that the relative width-to-length ratio ($X/Z'$ as defined below) of such a crystal is highly critical in avoiding unwanted resonant modes. The width-to-length ratios found to be most effective from this standpoint and thus within the scope of this invention are prescribed by the ranges: 0.20 to 0.23, 0.30 to 0.33, and 0.48 to 0.69.

DT-cut quartz crystals for piezoelectric devices have been known and used for many years and are described and claimed in United States Patent 2,268,365 issued to G. W. Willard on December 30, 1941. Various rectangular DT-cut quartz crystals for operation at the fundamental frequency are described and claimed in United States patent application of J. J. Royer, Ser. No. 402,488, filed Oct. 8, 1964, and in United States patent application of J. J. Royer, Ser. No. 448,601, filed Apr. 16, 1965. These applications recommend ranges of relative dimensions which provide crystals particularly free of unwanted resonances. However, these crystal geometries are specific to the fundamental mode of operation and quartz crystals embodying these principles are expected to be less effective at higher frequencies than are the crystal designs embodied herein. DT quartz resonators having the width-to-length ratios prescribed herein and operating at the second overtone are unexpectedly efficient and free of unwanted modes.

These and other aspects of the invention will be appreciated from the following detailed description. In the drawing.

Figure 1:
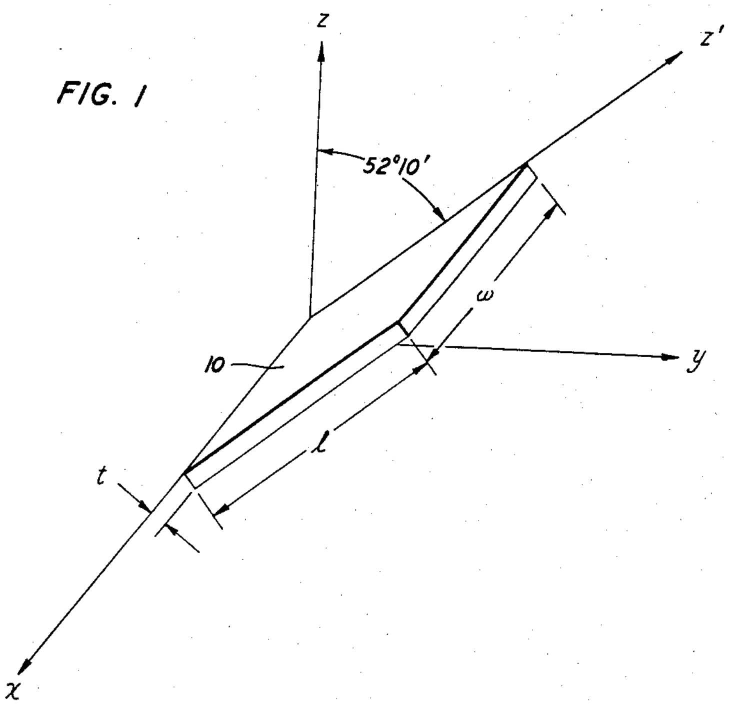
FIG. 1 is a dimensional representation showing the orientation of the standard DT-cut crystal with respect to the three major crystal axes.
Figure 2A:
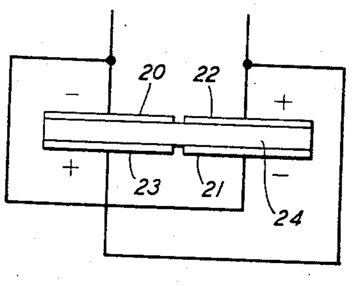
FIG. 2A is a front view of a quartz crystal illustrating one manner of attaching electrodes for second overtone operation.
Figure 2B:
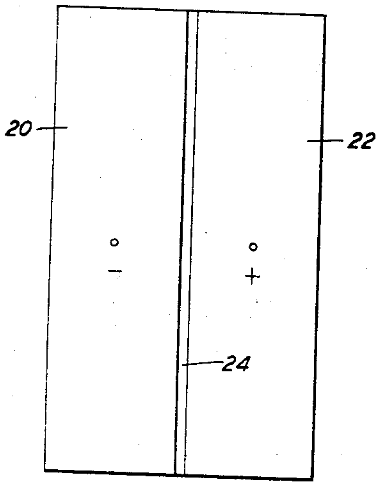
FIG. 2B is a plan view of FIG. 2A.

The critical width-to-length ratios for second overtone DT quartz crystals were established using the following procedure:

The quartz resonator used in the tests was a DT quartz plate, 20.7 mm. square and 1 mm. thick, having an orientation of YZW −52° 10'. FIG. 1 shows the orientation of the plate 10 with respect to the major axis and defines the width and length dimensions relative to these axes also. The electrode plating was split along the length (Z') center line of the plate so as to form two separate electrodes on each side. One method for making the electrode attachments is shown in FIG. 2A. The two pairs of electrodes 20, 21 and 22, 23, diagonally opposite each other through the thickness of the plate 24, are connected together electrically. The plan view for this arrangement is shown in FIG. 2B.

Figure 3A:
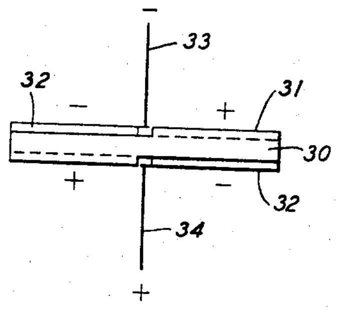
FIG. 3A is a front view similar to FIG. 2A of a quartz crystal with electrodes attached in a different manner.
Figure 3B:
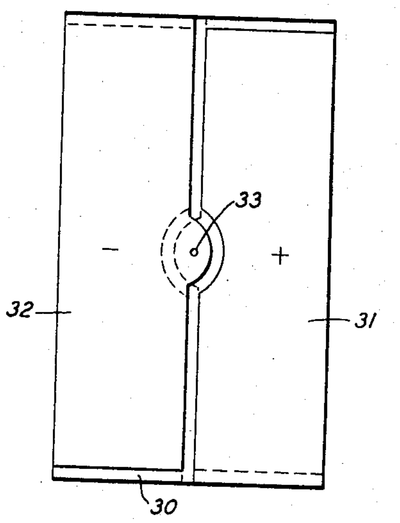
FIG. 3B is a plan view of FIG. 3A.

An alternative electrode arrangement is shown in FIG. 3A and FIG. 3B. In FIG. 3A the edges of the quartz plate 30 are plated so that the electrode 31 is continuous from the upper surface to the lower surface and the electrode 32 is connected from the upper surface to the lower surface along the rear edge of the crystal (not shown). This arrangement requires only two lead wires 33 and 34. Certain aspects of the construction detail of this embodiment may be more easily appreciated by viewing FIG. 3B which is a plan view of FIG. 3A.

Figure 4A:
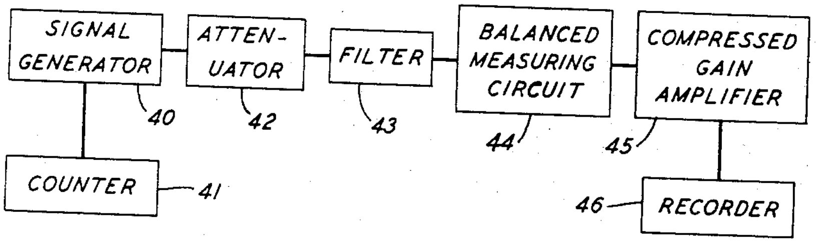
FIG. 4A is a block circuit diagram showing the electrical circuit apparatus used for obtaining the data which aided in determining the critical crystal dimensions of this invention.
Figure 4B:
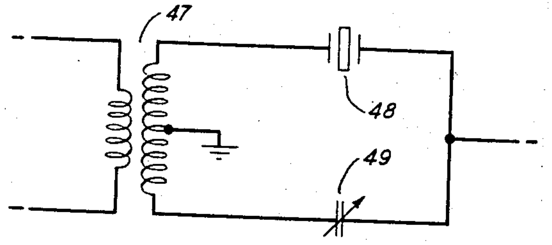
FIG. 4B is an electrical circuit diagram showing the balanced measuring circuit of FIG. 3A in detail.

The resonance frequency and amplitude of each mode of vibration were recorded over the frequency range 50 to 1500 kc. These operations were repeated from 38 different widths as the plate was changed in width from 20.7 to 2.1 mm. Approximately equal amounts of quartz were removed from both lengthwise minor surfaces, and the resonance spectrum measured at approximately every 0.5 mm. decrease in width. The wires attached to each plated section were moved four times during the width reduction in order to keep them aproximately centered. Many of the modes were of high resistance, therefore a balanced measuring circuit was used to detect them. This circuit is shown in FIG. 4A and consists of a signal generator 40 and counter 41 in series with an attenuator 42, a filter 43 (to eliminate harmonics of the generator), a balanced measuring circuit 44, a compressed gain amplifier 45 and a recorder 46. The balanced measuring circuit 44 is shown in detail in FIG. 4B and consists of transformer 47 with the center tap of the secondary grounded and the crystal unit 48 and a variable capacitor 49, in parallel.

As the crystal was scanned by varying the frequency of the source 40 over the range indicated, various resonances were recorded. These are plotted in FIG. 5 with the width-to-length ($X/Z'$) ratio as abscissa and the commonly used "frequency constant," which in this case was frequency times width, as ordinate.

Figure 5:
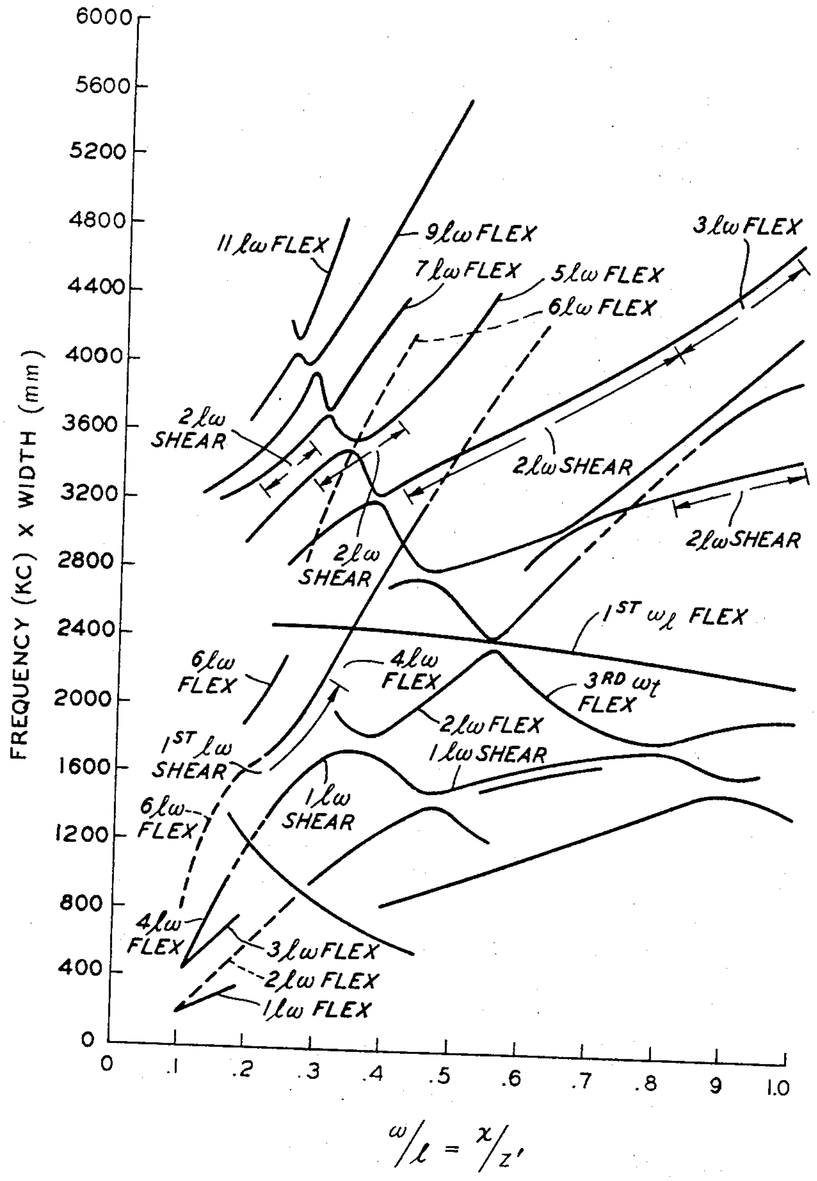
FIG. 5 is a plot of the frequency constant (frequency in kc. times width in mm.) versus width-to-length ratio ($X/Z'$) showing the various resonant modes produced in a typical rectangular DT-cut crystal with split electrodes.

Several modes are identified in FIG. 5 indicating the complexity of the resonant characteristics of this type of crystal. In this case the second overtone width shear is the mode of interest and is identified in FIG. 5 as "2 *lw* SHEAR." Its proximity to unwanted modes is apparent, particularly the "3 *lw* FLEX" in the upper right hand corner, the "5 *lw* FLEX" associated with the middle portion of the "2 *lw* SHEAR" and the "7 *lw* FLEX" associated with the "2 *lw* SHEAR" at the low $w/l$ ratios. These are third, fifth, and seventh overtones operating in a flexure mode. In crystals of this type it is known that the flexure mode is considerably less efficient than the shear mode. Consequently the close association or crossing of the wanted second overtone shear mode with unwanted flexure modes is of vital concern to the crystal designer. The objective is to produce a crystal which oscillates as purely in the desired shear mode as possible.

Once having established the identity and location of the wanted and unwanted resonances, a more precise indication of the favorable width-to-length ratios can be obtained by studying the ratio of capacitances for plates of varying ratios.

The well-known ratio of capacitances, $r$, for a resonant crystal is expressed by $$r=\frac{f_R^2}{f_A^2-f_R^2} \qquad (1)$$

where $F_R$ is the principal resonance frequency of the crystal plate and $f_A$ is the anti-resonance frequency associated with $f_R$.

Since $f_R$ is large compared with the difference between $f_A$ and $f_R$ expression (1) may be considered simply as:

$$r=\frac{f_R}{2(f_A-f_R)} \qquad (2)$$

The ratio of capacitances $r$ is an accepted figure of merit for quartz crystals and is preferably as small as practically possible. The value of $r$ for crystals having various width-to-length ratios was measured using standard technique by applying a range of frequencies to the crystal being tested and measuring the resonance frequency and the anti-resonance frequency.

Figure 6:
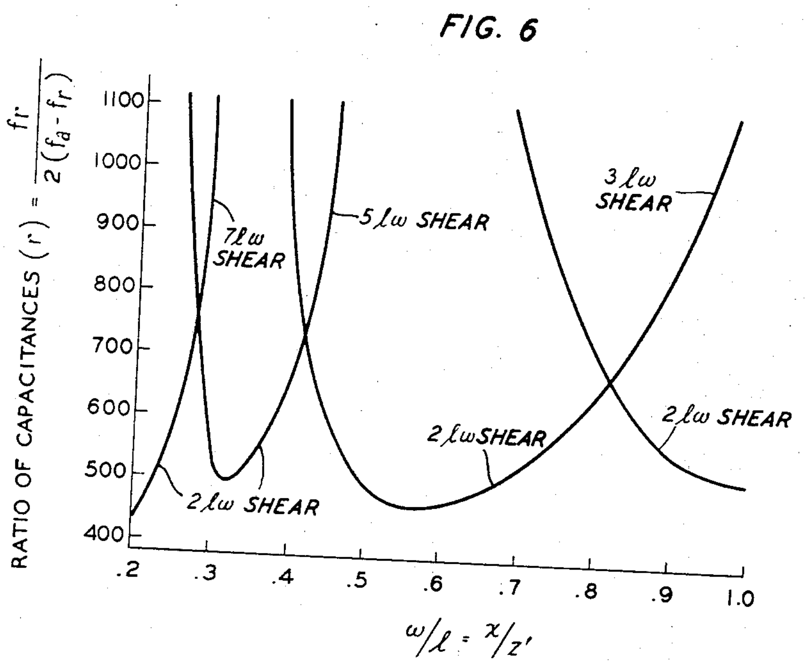
FIG. 6 is a plot of the ratio of capacitances $r$ versus width-to-length ratio for the DT crystals of this invention.

The data obtained from these measurements is plotted in FIG. 6. The ratio of capacitances $r$ is plotted as ordinate with width-to-length ratio plotted as abscissa. The "2 *lw* SHEAR" mode is easily identified as that giving the lowest ratio of capacitances. The crossover points, such as that appearing at a width-to-length ratio of approximately .82, indicates that in a crystal with these dimensions the unwanted third overtone flexure mode would be competing strongly with the second overtone shear mode. Such a crystal would be undesirable for producing, or filtering, a pure second overtone frequency. The desirable width-to-length ratios for crystals which produce purer second overtone shear mode resonances are represented by the minima of the curves in FIG. 6, or $w/l=0.32$, 0.56 and less than 0.20. (The minima around $w/l<0.20$ was not determined due to the impractical shape of the crystal. For this reason crystals having $w/l$ ratios below 0.20 are not considered within the scope of this invention.) A crystal giving a ratio of capacitances $r$ of 500 or less is considered to be outstanding from this standpoint. This criterion is used to arrive at the following prescribed ranges of width-to-length ratios which result in superior performance and are thus within the scope of this invention: $w/l=X/Z'=0.20$ to 0.23, 0.30 to 0.35 and 0.48 to 0.69.

In order to select a crystal geometry for a filter or oscillator at a given resonant frequency the absolute width can be determined from the curve of FIG. 5. A desirable width-to-length ratio such as 0.58 is chosen in accordance with the discussion of FIG. 6 and the corresponding frequency constant, 3700, is read off the ordinate. For a 1 mc. resonator the quartz plate would have a width of approximately 3.7 mm. and a length of 6.38 mm.

Various additional modifications and extensions of this invention will become apparent to those skilled in the art, i.e., if Z' is designated as the width, a resonance pattern similar to FIG. 4 can be obtained and appropriate ratios of $w/l$ could be chosen for design purposes. Also if the thickness were varied the corresponding thickness dependent modes (flexure) could be determined. All such variations and deviations which basically rely on the teachings through which this invention has advanced the art are properly considered within the spirit and scope of this invention.

What is claimed is:

1. A rectangular DT quartz crystal having electrodes on each major face (Y' plane) said electrodes being split along the Z' axis so that the crystal is adapted for operating at the second overtone width shear frequency, the crystal having a ratio of width (X direction) to length (Z' direction) in the range 0.48 to 0.69.

2. The DT quartz crystal of claim 1 having a width (X direction) to length (Z' direction) ratio of approximately 0.57.

References Cited

UNITED STATES PATENTS

| | | | |
|---|---|---|---|
| 2,271,870 | 2/1942 | Mason | 310—9.5 |
| 2,410,825 | 11/1946 | Lane | 310—9.5 |
| 3,072,806 | 1/1963 | Sogn | 310—9.5 |
| 3,202,846 | 8/1965 | Ballato | 310—9.5 |
| 3,334,251 | 8/1967 | Royer | 310—9.5 |

J D MILLER, *Primary Examiner.*